(12) United States Patent
Borgmann et al.

(10) Patent No.: US 10,327,380 B2
(45) Date of Patent: Jun. 25, 2019

(54) ROOT CROP HARVESTER

(71) Applicant: Spudnik Equipment Co., LLC, Blackfoot, ID (US)

(72) Inventors: Rainer Borgmann, Idaho Falls, ID (US); Hugo Dabbelt, Shelley, ID (US); Rainer Kemper, Idaho Falls, ID (US); Andy Florence, Idaho Falls, ID (US); Evan Steel, Idaho Falls, ID (US)

(73) Assignee: SPUDNIK EQUIPMENT CO., LLC, Blackfoot, ID (US)

( * ) Notice: Subject to any disclaimer, the term of this patent is extended or adjusted under 35 U.S.C. 154(b) by 800 days.

(21) Appl. No.: 14/979,352

(22) Filed: Dec. 22, 2015

(65) Prior Publication Data
US 2017/0172061 A1    Jun. 22, 2017

(51) Int. Cl.
*A01D 25/00*    (2006.01)
*A01D 25/04*    (2006.01)

(52) U.S. Cl.
CPC ........... *A01D 25/005* (2013.01); *A01D 25/04* (2013.01)

(58) Field of Classification Search
CPC .............................. A01D 25/005; A01D 25/04
USPC ..................................................... 171/44, 58
See application file for complete search history.

(56) References Cited

U.S. PATENT DOCUMENTS

| 2,682,739 | A |   | 7/1954  | Bozeman, Sr. et al. |
|-----------|---|---|---------|---------------------|
| 3,070,175 | A |   | 12/1962 | McCollum            |
| 3,191,686 | A | * | 6/1965  | Everett et al. ......... A01D 17/06 171/58 |
| 3,419,084 | A |   | 12/1968 | Barows et al.       |
| 3,425,494 | A |   | 2/1969  | Parrish             |
| 3,454,099 | A |   | 7/1969  | Wells               |
| 4,011,912 | A | * | 3/1977  | Verplanke ............ A01D 25/005 171/101 |
| 4,116,279 | A | * | 9/1978  | Kilburn ................. A01D 17/06 171/58 |
| 4,345,531 | A | * | 8/1982  | Redl ..................... A01B 77/00 111/158 |
| 4,942,927 | A |   | 7/1990  | Halfmann            |
| 8,074,434 | B2|   | 12/2011 | Taylor et al.       |

FOREIGN PATENT DOCUMENTS

CN    202722029 U    2/2013

\* cited by examiner

*Primary Examiner* — Thomas B Will
*Assistant Examiner* — Joel F. Mitchell
(74) *Attorney, Agent, or Firm* — Parsons Behle & Latimer

(57) ABSTRACT

A sugar beet puller wheel set includes a pair of generally upright, spaced apart, symmetrically non-parallel puller wheels, rotatably disposed on axles attached to a frame and having a gap therebetween. A gap adjuster is associated with at least one of the puller wheels, and is configured to move the at least one puller wheel axially along the respective axle with axial rotation of the gap adjuster, allowing selective adjustment of the gap.

20 Claims, 7 Drawing Sheets ns at opposite ends thereof, and each wheel is rotatably attached to a respective collar. Axial rotation of the collar causes lateral translation of the collar and the rotatably attached puller wheel, whereby the minimum gap is selectively adjustable.

ROOT CROP HARVESTER

FIELD OF THE DISCLOSURE

The present application relates to equipment for harvesting root vegetables, such as sugar beets. More particularly, the present application relates to a harvester with puller wheels having a gap that is quickly and easily adjusted for different size vegetables.

BACKGROUND

Sugar beets are one type of root vegetable that is cultivated and harvested in large quantities. Sugar beets and other similar root vegetables can be harvested using a harvester having sets of puller wheels that are attached to a frame that is drawn along the ground behind a tractor, the puller wheels gripping and pulling each sugar beet from the ground. In this type of harvester, each pair of puller wheels are aligned with each row of beets, and the wheels are canted at an angle relative to each other and relative to the direction of motion of the tractor. This angle of the wheels relative to the direction of the pulling vehicle causes the wheels to rotate as they are drawn along the ground, and to dig into the ground. The angle of the wheels relative to each other causes them to grip the sugar beets as the device rolls along, grabbing and pulling them out of the ground.

As is well known, however, sugar beets are not always of a consistent size. Depending on weather conditions, soil conditions, and other variables, the average size of beets in a given beet crop can vary. If the beet puller wheels are too far apart for the average size of a given crop, they will not effectively pull the bees out of the ground. On the other hand, if the puller wheels are too close together, the wheels will tend to damage the crop, which will reduce crop yield. Prior sugar beet puller wheel sets are generally fixed in their positioning, and with many of them the gap between adjacent wheels can only be changed by unbolting the wheels and inserting spacers to increase the gap. This sort of adjustment is complicated and time-consuming.

The present application is directed to one or more of the above issues.

SUMMARY

In accordance with one aspect thereof, the present disclosure provides a sugar beet puller wheel set that includes a pair of generally upright, spaced apart, symmetrically non-parallel puller wheels, rotatably disposed on axles attached to a frame and having a gap therebetween. A gap adjuster is associated with at least one of the puller wheels, and is configured to move the at least one puller wheel axially along the respective axle with axial rotation of the gap adjuster, allowing selective adjustment of the gap.

In accordance with another aspect thereof, the present disclosure provides a sugar beet harvester apparatus, including a wheeled frame, attachable to a pulling vehicle and configured to move along ground, with a plurality of pairs of axles, attached to the frame. A plurality of pairs of generally upright, spaced apart, symmetrically non-parallel puller wheels are provided, each puller wheel being associated with one of the axles, and each puller wheel having a rim configured for cutting into the ground. Each pair of puller wheels have a rearward portion with a point of minimum gap therebetween. A wheel gap adjuster is associated with each pair of puller wheels. The wheel gap adjuster includes a collar, slidably disposed upon each axle, with helical bearings at opposite ends thereof, and each wheel is rotatably attached to a respective collar. Axial rotation of the collar causes lateral translation of the collar and the rotatably attached puller wheel, whereby the minimum gap is selectively adjustable.

In accordance with yet another aspect thereof, the present disclosure provides a sugar beet harvester apparatus including a plurality of pairs of generally upright, spaced apart, symmetrically rearwardly canted puller wheels, disposed in a transverse row. Each puller wheel has an axle and a rim configured for cutting into the ground, and each pair of puller wheels has a minimum gap in a rearward region. A rotatable collar is disposed upon each axle, with each wheel being rotatably attached to a respective rotatable collar. The rotatable collar has helical bearings at opposite ends thereof. Axial rotation of the collar upon its respective axle causes lateral translation of the collar and the attached puller wheel, whereby the minimum gap is selectively adjustable.

Figure 1:
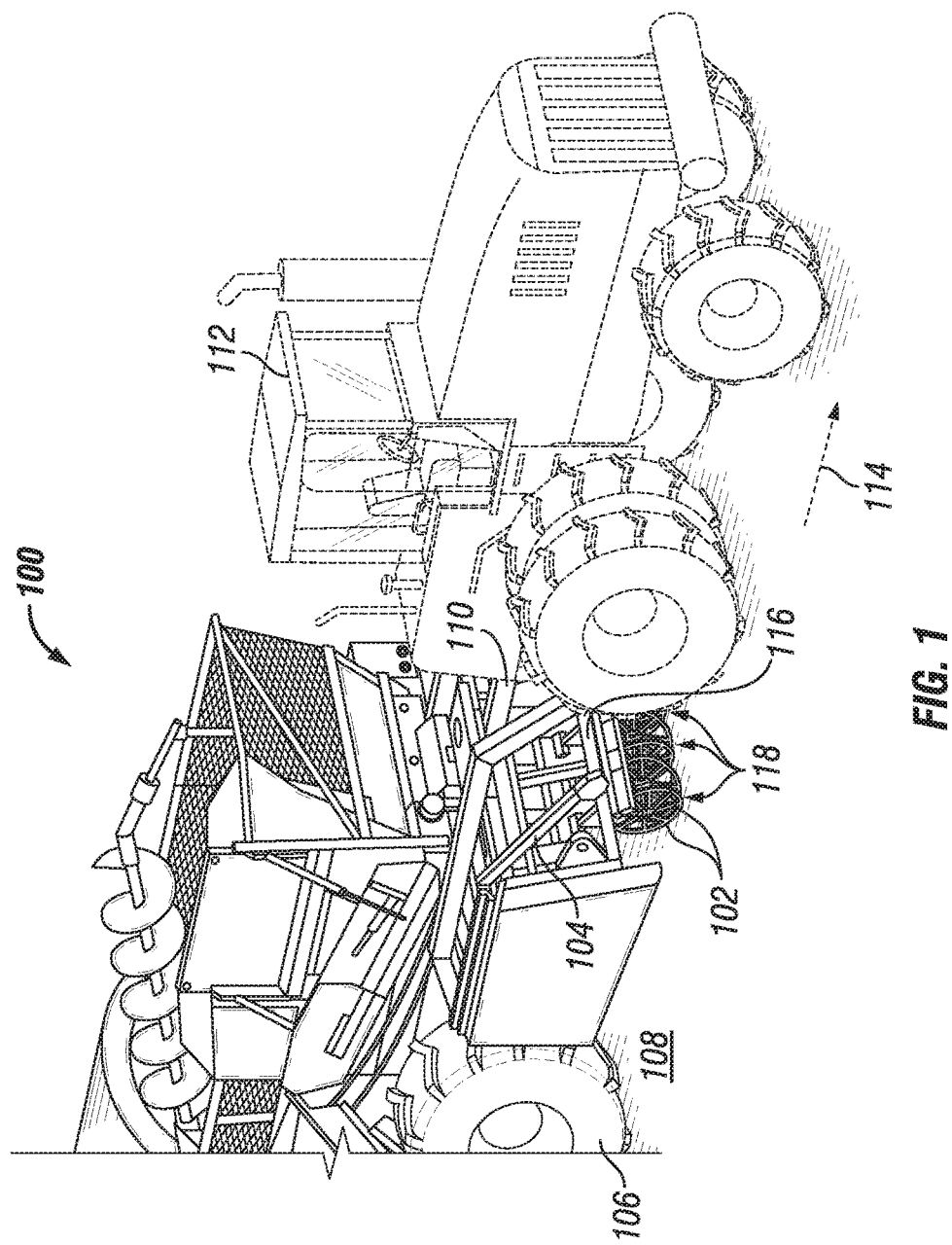
FIG. 1 is a front perspective view of a beet harvester mechanism coupled to a tractor, the beet harvester having a plurality of pairs of puller wheels having a gap adjustment mechanism in accordance with the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Figure 2:
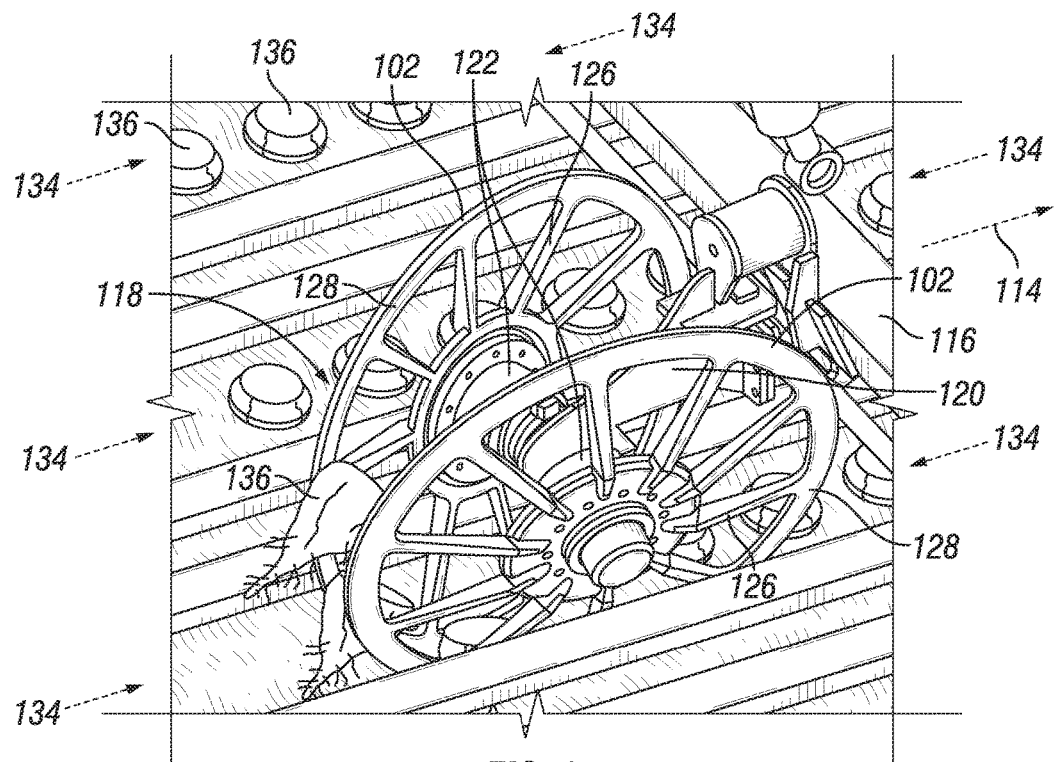
FIG. 2 is a rear perspective view of a pair of puller wheels in operation, the puller wheels having a gap adjustment mechanism in accordance with the present disclosure.

The present disclosure relates to devices for pulling and harvesting root crops, such as sugar beets. An exemplary sugar beet harvester 100 is shown in FIG. 1, and a close-up rear view of a pair of beet puller wheels 102 is shown in FIG. 2. The sugar beet harvester 100 generally includes a frame 104, and wheels 106 for supporting it on the ground 108, and a hitch 110 for connecting the harvester 100 to a towing or pulling vehicle 112, such as a tractor, for pulling it in a field in a harvesting direction, indicated by arrow 114. The frame 104 includes at least one transverse member 116, to which are attached, at row width intervals, a plurality of harvesting wheel units 118. Each harvesting unit includes a pair of generally upright, spaced apart, symmetrically non-parallel puller wheels 102 of the same size and shape, which are rotatably disposed on axle assemblies 122 (shown in FIG. 2) that are attached to the transverse member 116 of the frame 104.

Figure 3:
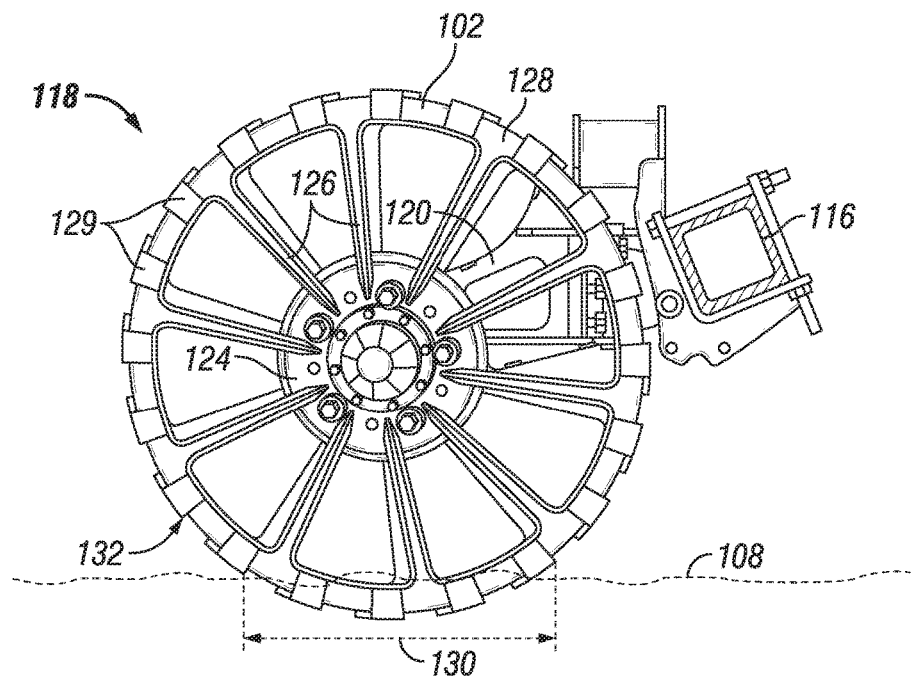
FIG. 3 is a side view of a pair of puller wheels having a gap adjustment mechanism in accordance with the present disclosure.
Figure 4:
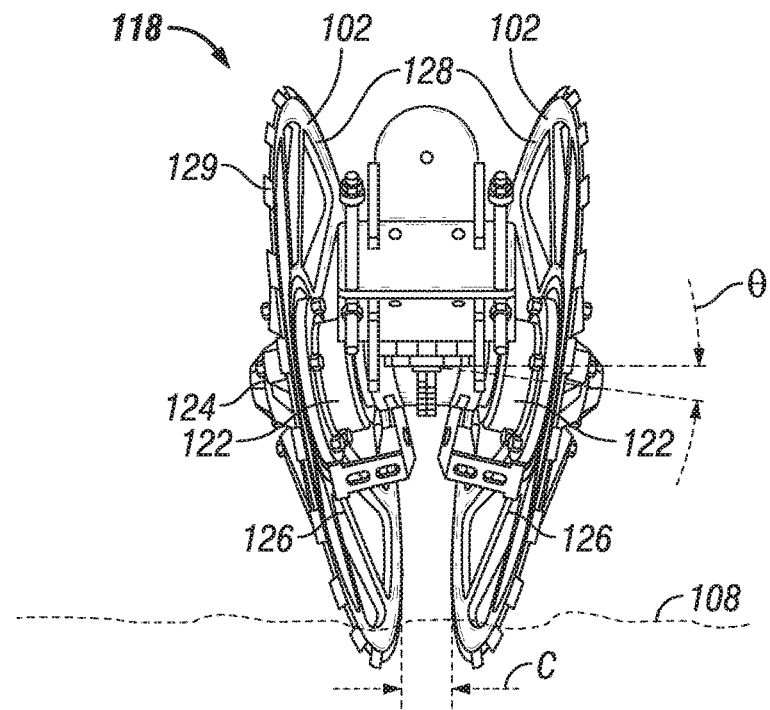
FIG. 4 is a front view of a pair of puller wheels having a gap adjustment mechanism in accordance with the present disclosure.
Figure 5:
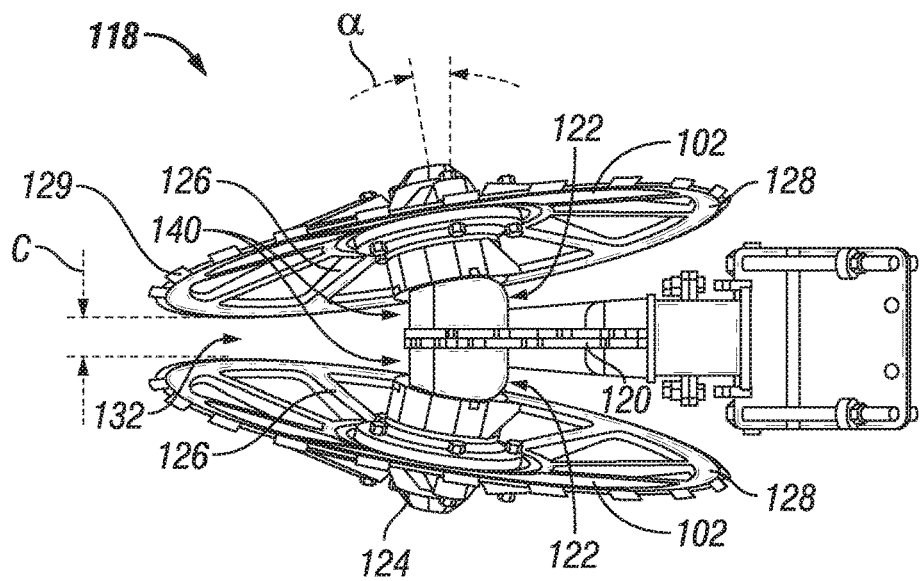
FIG. 5 is a top view of a pair of puller wheels having a gap adjustment mechanism in accordance with the present disclosure.

A rear perspective view of an embodiment of a single harvesting wheel unit 118 is shown in FIG. 2. Side, front and top views of another embodiment of a single harvesting wheel unit are shown in FIGS. 3-5. Each harvesting wheel unit 118 includes a longitudinal support member 120, which is attached to the transverse frame member 116 in a trailing orientation, and a pair of generally oppositely oriented, fixed wheel axle assemblies 122, which are attached to the transverse frame member 116 via a respective longitudinal support member 120, which is generally perpendicular to the transverse frame member. The wheel axle assemblies 122 in each pair are oriented at symmetrically opposite downward and rearward offset angles, which provides the symmetrically non-parallel orientation of the wheels 102. That is, the wheel axle assemblies are attached to the longitudinal support member 120 with a rearward horizontal angular offset α, and a downward vertical angular offset θ. These angular offsets are best shown in FIGS. 4 and 5.

As used herein, the term "symmetrically non-parallel" is intended to indicate that the wheels are aligned with each other, but are not parallel to each other, and that the angular offsets of each wheel of each pair are equal and opposite to each other, with respect to the orientation of the transverse member 116 and the longitudinal support member 120, and with respect to the pulling direction of the harvester. Stated differently, the puller wheels are rearwardly and downwardly canted. That is, the wheels in each pair are symmetrically canted or angled with respect to each other so that they have a larger gap between them toward the front (i.e. relative to the harvesting direction) and top, and a smaller gap toward the bottom and rear of the pair. The symmetry of the gap allows the puller wheels to track in a straight line as they dig into the ground while the harvester is pulled along, so that lateral forces upon the opposing wheels tend to cancel each other out.

The angular offsets of the wheels and their axles can vary. It is to be appreciated that angular offsets that are too large will tend to pick up a larger quantity of soil when harvesting, which the harvester device must then process. A larger angular offset will also tend to produce more rolling resistance than is desired. On the other hand, if the angular offsets are too small, this can affect the gripping and pulling action of the puller wheels. In one embodiment, the rearward horizontal angular offset α is about 10°, and the downward vertical angular offset θ is about 9°. Other angles can also be used. In general, it is believed that the rearward horizontal angular offset α can be from about (i.e. plus or minus 1°) 7° to about 13°, and the downward vertical angular offset θ can be from about 6° to about 12°.

Each puller wheel 102 has a central wheel hub 124 and a plurality of spokes 126 that connect the perimeter rim 128 of the wheel 102 to the wheel axle assembly 122. The rim 128 provides a sharpened disk edge for cutting into the ground 108. Each wheel 102 and its rim 128 are positioned to contact and cut into the ground 108 in a cut region 130 (best shown in FIG. 3) as a respective pair of wheels 102 rolls thereover. The rim 128 can be smooth, as in the embodiment of FIG. 2 (and FIGS. 6B-B and FIG. 11), or it can include teeth 129 disposed around its perimeter, as shown in the embodiment of FIGS. 3-5 (and FIGS. 9, 10A-B). The teeth 129 provide traction so that the wheel 102 rotates, instead of merely sliding against the ground, and can also help the wheel 102 to cut into hard ground in the cut region.

Because of the angular orientation of the wheel axle assemblies 122, the wheels 102 are generally upright, but the wheels in each pair are canted or symmetrically non-parallel because of the horizontal and vertical angular offsets α and θ discussed above. Accordingly, each wheel pair has a point 132 of minimum gap or minimum clearance C in a rearward portion of the cut region 130. As the harvester apparatus 100 is pulled along the ground 108 in alignment with the crop rows 134 (FIG. 2) of root vegetables 136, such as sugar beets, the wheels 102 cut into the ground 108 in the cut region 130 on opposing sides of the row 134 of root vegetables 136, and the rotational motion of the wheels 102 causes the rims 128 of the wheels 102 to draw together as they rotate, approaching the point of minimum clearance 132. In this motion, the rims 128 of the wheels 102 draw toward each other, grip the vegetable 136 and pull it from the ground as the trailing portions of the opposing wheels 102 rise. As the wheels 102 rotate past the point of minimum clearance 132, the trailing portions of the wheel rims 128 will draw away from each other, releasing the withdrawn vegetable 136. At this point, a rotating shaft with paddles (not shown) can then knock the beets out from between the puller wheels 102 and onto a roller (not shown) or conveyor (not shown) that is positioned behind the puller wheels 102.

As noted above, sugar beets and other root vegetables are not always the same size, both from year to year and from field to field. Depending on weather conditions, soil conditions, and other variables, the average size of beets in a given beet crop can vary. This presents a problem for prior beet puller wheels. If the beet puller wheels are too close together for the average size of a given crop, the wheels will tend to damage the crop, which will reduce crop yield. This suggests the desirability of adjusting the gap between adjacent wheels.

In the past, adjusting the gap between adjacent puller wheels of a beet harvested has involved the installation of shims that are placed between each wheel and its hub. Adjusting the gap between puller wheels in this manner involves removing multiple lug bolts connecting each wheel to its hub, placing a shim, and then reattaching each wheel with its multiple lug bolts, and repeating this sequence of steps for every puller wheel. It will be appreciated that this approach is time consuming and relatively complicated. The time and effort involved make this approach impractical for frequent adjustments that may be desirable for a given crop.

Advantageously, the present disclosure provides a beet harvesting system with beet puller wheels having a quick-adjust gap. As shown in FIGS. 3-5, each of the puller wheels 102 (or at least one wheel in each puller wheel pair 118) includes a gap adjuster 140, which is configured to move the respective puller wheel linearly or axially along its axle assembly 122, allowing selective adjustment of the gap C. For each pair 118 of wheels there can be a pair of gap adjuster 140s, each associated with one of the pair 118 of puller wheels 102.

Figure 6:
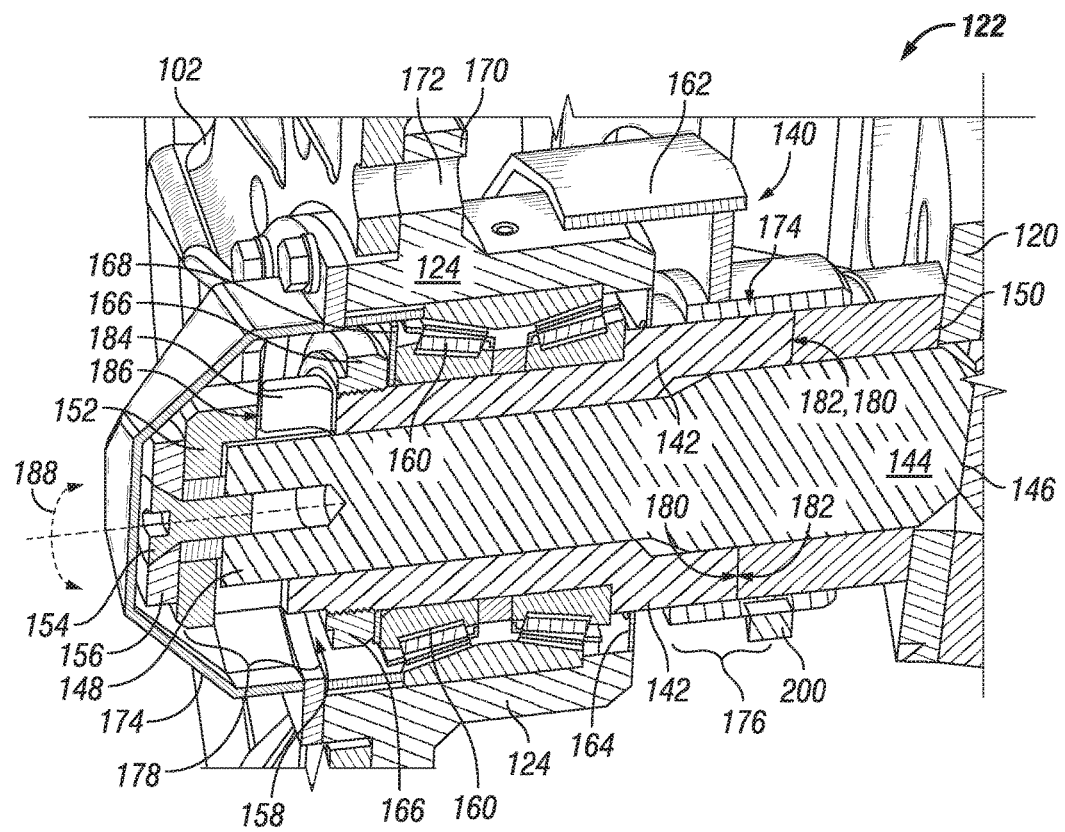
FIG. 6 is a cross-sectional view of a puller wheel axle assembly having a gap adjustment mechanism in accordance with the present disclosure.
Figure 7:
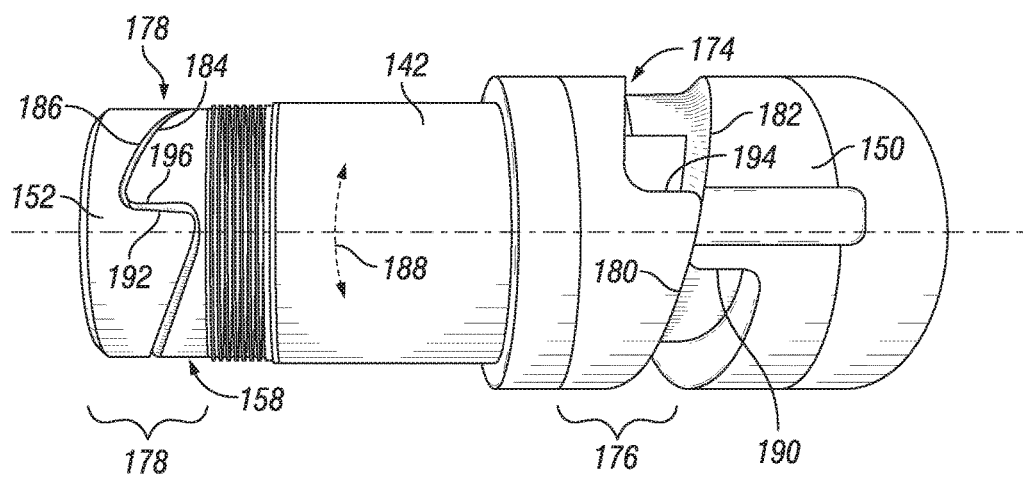
FIG. 7 is a detail view of elements of the axle assembly of FIG. 6, showing the collar and first and second helical bearings.

Shown in FIG. 6 is a cross-sectional view of a puller wheel axle assembly 122 having a gap adjustment mechanism 140 in accordance with the present disclosure, and FIG. 7 provides a detail view of the sliding collar 142 and helical bearings of the axle assembly 122. As shown in FIG. 6, the axle assembly 122 generally includes an axle 144, having a proximal end 146 and a distal end 148, which is fixedly connected at the proximal end 146 to the trailing end of the longitudinal support member 120 at the downward and rearward offset angle discussed above. A helical mount 150 is fixedly attached to the longitudinal support member 120 and the axle 144 at the proximal end 146, and a helical cap 152 is fixedly attached to the axle 144 at the distal end 148 with a fastener 154 and a washer 156. The longitudinal support member 120, axle 144, helical mount 150 and helical cap 152 can be fabricated of steel, for strength and durability. Other materials can also be used, such as aluminum and polymer materials, and combinations of different materials. For example, metal bearing surfaces could be lined with UHMW plastic, as one alternative.

Slidably disposed upon the axle 144 between the helical mount 150 and the helical cap 152 is a moveable collar 142. The collar 142 can be of steel or aluminum, for strength and durability. Other materials and combinations of materials can also be used, as discussed above. Disposed upon the collar 142 toward its distal end are roller bearings 160, to which the hub 124 of the puller wheel 102 is mounted. In this way the puller wheel 102 is rotatably attached to a respective collar 142. A circular or semi-circular bearing housing or shield 162 can extend from the collar 142. This bearing housing or shield 162 is positioned to cover at least a portion of the bearing assembly, in order to keep debris or contaminants away from the bearing housing seals and thus reduce the risk of such materials from entering and damaging components of the bearings.

In order to protect the roller bearings 160 from dirt and contamination, an inner bearing seal 164 is attached to the wheel hub 124 and a bearing lock nut 166 and outer bearing seal 168 are attached to the collar 142 at the distal end 158. These seals prevent dirt or debris from entering into the bearing region, so that good bearing lubrication can be maintained. The hub 124 of the puller wheel 102 includes a flange 170 with holes 172 for lug bolts (not shown) extending therethrough. A dust cap 174 is attached to the wheel hub 124 to further protect the wheel bearings 160, the gap adjuster mechanism 140 and other components of the axle assembly 122 from dirt, etc.

The moveable collar 142 has a proximal end 174 and a distal end 158, and is slidably disposed upon the axle 144. The collar 142 includes a first helical bearing, indicated generally at 176, at the proximal end 174, and a second helical bearing, indicated generally at 178, at the distal end 158. The first and second helical bearings 176, 178 include helical surfaces, disposed at the proximal and distal ends 174, 158 of the moveable collar 142. Corresponding opposing helical surfaces are associated with the helical mount 150 and the helical cap 152, which are fixedly attached to the axle 144. These helical surfaces include proximal helical surfaces 180, 182 and distal helical surfaces 184, 186. The helical bearing surface 186 of the helical cap 152 is positioned in sliding contact with the corresponding helical surface 184 at the distal end 158 of the collar 142, and the helical surface 182 of the helical mount 150 is positioned in sliding contact with the helical surface 180 at the proximal end 174 of the collar 142. The gap adjuster mechanism 140 is defined to include the moveable collar 142, and the helical bearings 176, 178 at the proximal and distal ends 174, 158.

The helical bearings 176, 178 are defined to include the helical bearing surfaces 180, 182, 184 and 186 associated with the collar 142, the helical cap 152 and the helical mount 150.

It is to be understood that multiple helical surfaces can be associated with each part of the bearing. For example, the proximal helical surfaces 180 of the collar 142 can include two or three or more individual angled surfaces, which are in contact with corresponding helical surfaces 182 of the helical mount 150. The helical bearings 176, 178 of the gap adjuster 140 can each include just one helical surface each, or 2, 3, 4, 5 or almost any desired number of helical bearing surfaces.

Actuation of this gap adjuster 140 is by axial rotation of the collar 142. That is, axial rotation of the collar 142 upon the axle 144, as indicated by arrow 188 causes lateral motion of the collar 142 and the respective puller wheel 102 due to sliding wedge action of the helical bearings 176, 178. Specifically, rotational sliding of the helical surfaces 180, 184 of the collar 142 against the opposing helical surfaces 182, 186 of the helical cap 152 and helical mount 150 produces axial or lateral translation of the collar 142 along the axle 144, which has the effect of linearly moving the position of the wheel 102 along the axle 144. When the collar 142 is rotated upon the axle 144, the helical bearings 176, 178 at the opposing ends of the collar 142 cause it to translate linearly upon the axle 144, thus increasing or decreasing the gap 132 between the wheel 102 and the longitudinal support member 120, depending upon the direction of rotation. In this way, the minimum gap 132 is selectively adjustable.

As seen most clearly in FIG. 7, the helical bearings 176, 178 are limited in their total range of travel by shoulders at the ends of the helical surfaces. Specifically, the helical mount 150 includes a shoulder 190 at one end of its helical surface 182, and the helical cap 152 also includes a shoulder 192 at one end of its helical surface 186. Likewise, the collar 142 includes corresponding shoulders 194, 196 at the ends of its helical surfaces 180, 184. That is, a first shoulder 194 is located at one end of the proximal helical surface 180 of the collar 142, and a second shoulder 196 is located at one end of the distal helical surface 184 of the collar 142. As shown in FIG. 7, which depicts the maximum extended position of the gap adjuster mechanism 140, the corresponding shoulders 192, 196 of the helical cap 152 and of the distal end 158 of the collar 142 are in contact with each other, while the corresponding shoulders 190, 194 of the helical mount 150 and of the proximal end 174 of the collar 142 are not in contact with each other. Conversely, when the gap adjuster 140 is adjusted to its fully retracted position, the opposite condition will occur.

The angle or pitch of the helical surfaces 180, 182, 184, 186 can vary. Those of skill in the art will recognize that variation of the pitch of the helical surfaces of the collar 142 and the helical mount 150 and helical cap 152 will change the rate at which the gap changes with a given magnitude of rotation of the collar 142. In one embodiment, the helical surfaces have a pitch of 3 inches per revolution (in./rev.), but it is believed that a wide range of different pitch levels can be used. For example, it is believed that a helical pitch of from 0.5 in./rev. to 6 in./rev. can be used. With a pitch of 3 in./rev., the collar 142 will travel a distance of 0.5" with 60 degrees of rotation. It is to be appreciated that the total range of travel of the gap adjuster will be affected by the pitch of the helical bearings and the number of helical bearing surfaces in each bearing. For example, with a pitch of 3 in./rev. and two bearing surfaces in each bearing, the maximum range of travel will be 1.5" because the maximum range of rotation of the collar 142 will be 180°. However, if each bearing includes three bearing surfaces, the maximum range of rotation will be 120° and the maximum range of travel will therefore be 1".

It is to be recognized that the gap adjuster 140 can be fully functional with a complete helical surface upon just one or the other of the collar 142 and the mount/cap 150/152 at either end of the collar 142, and not both. That is, if the cap 152 and the mount 150 include helical surfaces 182, 186 (as shown), the collar 142 can include corresponding bearing surfaces that are not necessarily helical and/or that do not surround the axle 144 to the same rotational extent, since the helical surfaces of the cap 152 and the mount 150 will provide the lateral thrust for moving the collar 142 along the axle 144. Indeed, the bearing surfaces 180, 184 of the collar 142 can be rounded or some other shape that does not exactly match the shape of the corresponding helical bearing surfaces 182, 186 of the mount 150 and the cap 152, so long as they provide sufficient bearing contact for the respective structures. The opposite can also be the case. That is, the collar 142 can include helical bearing surfaces 180, 184 (as shown) which bear against surfaces on the cap 152 and mount 150 that are not necessarily helical, and/or do not have the same rotational extent as the helical bearing surfaces 180, 184. It is also to be appreciated that, because of the rearwardly canted angle of the puller wheels 102 in relation to the direction of motion 114 of the harvester, forces transmitted by the puller wheels 102 to the axle assembly 122 will be primarily borne by the bearing surfaces of the distal bearing 178 at the cap 152, and relatively little force will be borne by the bearing surfaces of the proximal bearing 176 at the mount 150. In view of this, the proximal bearing 176 can be significantly altered or even eliminated in some embodiments.

In one embodiment, the gap adjuster 140 includes helical surfaces with a pitch of 3 in./rev., and the collar 142 has a maximum rotational travel of 60°, giving a maximum linear travel of 0.5". In this embodiment, where each puller wheel 102 in a pair 118 includes a gap adjuster 140, the total gap 132 between the wheels can be adjusted by up to 1". Other gap adjuster dimensions and parameters can also be used. Shown in FIGS. 8A-8D are top perspective views of a pair 118 of puller wheels 102 with a gap adjustment mechanism 140 in accordance with the present disclosure, showing the left wheel 102 and its hub 124 in four different adjustment positions. In these views the bearing housing or shield (162 in FIG. 6) and the dust cap (174 in FIG. 6) of the axle assembly 122 of the left puller wheel 102 have been removed so that operation of the gap adjuster 140 can be seen.

Figure 8A:
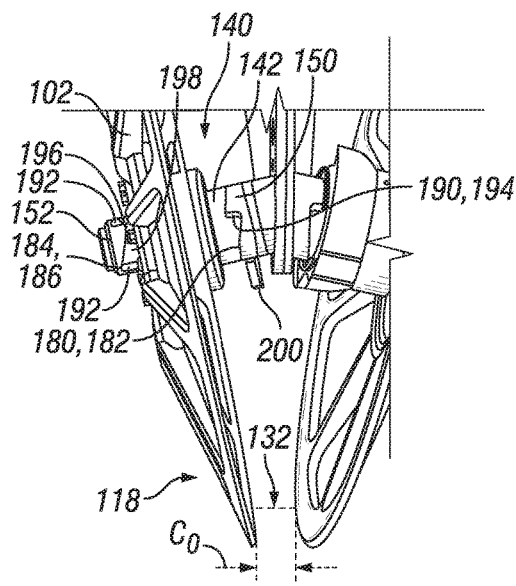
FIGS. 8A-8D are top, perspective views of a pair of puller wheels with a gap adjustment mechanism in accordance with the present disclosure, showing the left wheel and its hub in four different adjustment positions.

Referring to FIG. 8A, the proximal helical surface 180 of the collar 142 is shown in contact with the helical surface 182 of the helical mount 150, and the distal helical surface 184 of the collar 142 is shown in contact with the helical surface 186 of the helical cap 152 on the outward side of the puller wheel 102. In the position of FIG. 8A, the collar 142 is rotated to a fully retracted position, with the shoulder 194 of the proximal helical surface 180 of the collar 142 disposed adjacent to the shoulder 190 of the helical surface 182 of the helical mount 150, with little or no gap between these shoulder surfaces. On the other hand, on the outward side of the puller wheel 102, the shoulder 196 of the distal helical surface 184 of the collar 142 is disposed relatively far from the shoulder 192 of the helical surface 186 of the helical cap 152, with a significant gap between these surfaces. The right puller wheel 102 assembly is likewise fully retracted. In this fully retracted position, the minimum gap 132 between the puller wheels 102 is at its minimum, indicated as $C_0$. In one embodiment, the minimum gap $C_0$ between a pair 118 of puller wheels 102 with a gap adjustment system in accordance with the present disclosure that is fully retracted is 2".

Figure 8B:
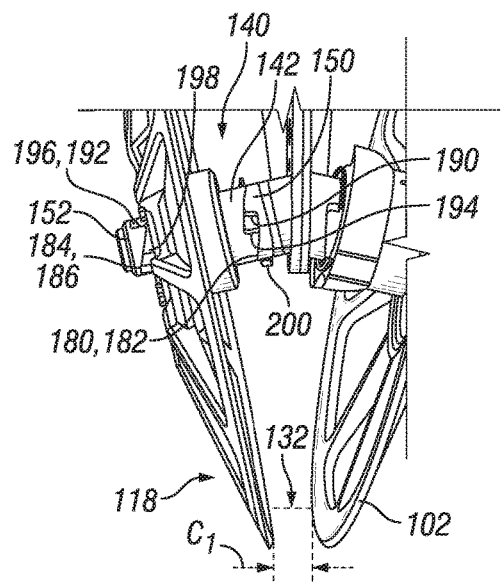

When the collar 142 is rotated upon the axle 144, the helical bearings 176, 178 slide against each other, and the shoulders 190, 194, of the helical surfaces at the proximal end 174 of the collar 142 move away from each other, while the shoulders 192, 196, at the distal end 158 of the collar 142 move toward each other. In the process, the collar 142 slides away from the longitudinal support member 120 of the puller wheel assembly 118, moving its attached puller wheel 102 and causing the gap 132 between the adjacent puller wheels 102 to increase to some value $C_1$. An initial rotation of the collar 142 by about 20° is illustrated in FIG. 8B, which in this embodiment has moved the left puller wheel 102 by about 0.166", causing the total puller wheel gap to increase to 2.166".

Figure 8C:
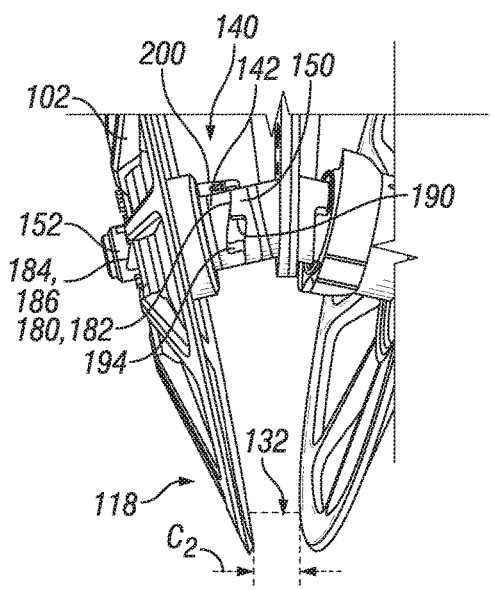
Figure 8D:
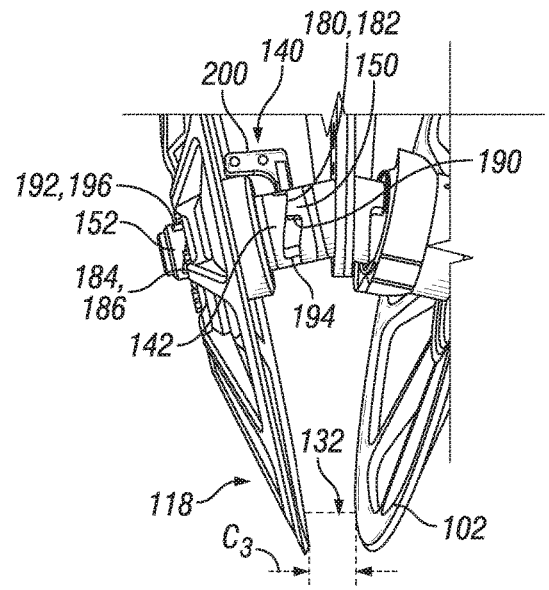

As illustrated in FIG. 8C, rotation of the collar 142 by another 20° shifts the left puller wheel 102 by another 0.166", and increases the total puller wheel gap to $C_2$, which can be 2.332". As shown in FIG. 8D, an additional 20° of rotation of the collar 142 shifts the left puller wheel 102 by another 0.166", increasing the total gap between the adjacent puller wheels 102 to $C_3$, which can be 2.5". In this position, the collar 142 is rotated to a fully extended position, with a maximum gap between the shoulders 190, 194 of the proximal helical bearing 176, while the shoulders 192, 196 at the distal helical bearing 178 are in close proximity or direct contact. It is to be understood that while the illustrations of FIGS. 8A-8D show only one of two puller wheels 102 being adjusted, both puller wheels 102 can be adjustable, allowing a greater range of gap adjustment.

Advantageously, the gap adjuster 140 disclosed herein can be infinitely adjustable within its adjustment range. That is, the relative magnitude of rotation of the collar 142 can be selected to be any amount between 0° and some maximum rotational amount, thus allowing selection of any minimum gap 132 between some minimum and maximum value. In one embodiment, the collar 142 is rotatable within a range of 60°, with helical surfaces having a pitch selected to cause the position of any single puller wheel 102 to be infinitely adjustable within a range of 0" to 0.5", depending on the angle of the collar 142. Other ranges of adjustment can also be selected. It is to be understood that this range of linear adjustment is measured along the axis of the axle assembly 122. It is also to be understood that where a pair of puller wheels are both adjusted, and the minimum gap between them is 2", the range of adjustment of the gap using these parameters will be from 2" to 3".

Where other parameters for the helical pitch and number of helical bearing surfaces associated with the bearings 176, 178 are used, other ranges will apply. For example, if the pitch of the helical bearing surfaces is 6 in./rev., and each bearing 176, 178 includes only one bearing surface, the total range of adjustability of each puller wheel will be 6", thus allowing a pair of puller wheels having a minimum gap of 2" to be adjustable within a range of 2" to 14". Gap adjusters allowing adjustment anywhere up to that level and beyond are contemplated by this disclosure.

As shown in FIG. 6 and FIGS. 8A-8D, the collar 142 also includes an actuator arm 200, which is provided to allow rotation of the collar 142. Rotation of the collar 142, and thus actuation of the gap adjuster 140, can be done in various ways. It will be apparent, for example, that manual adjustment of each gap adjuster 140 is possible. That is, a worker can temporarily attach a wrench or other tool to the actuator arm 200, and using manual force, rotate the collar 142 some selected amount, thus adjusting the lateral position of a given puller wheel 102 by a selected amount. By repeating this process for all puller wheels 102 in a given harvester device, the gaps 132 between all puller wheel pairs 118 can be adjusted. With the gap adjuster system shown herein, this method of adjusting the gap 132 between puller wheels 102 can be faster and more efficient than previous methods of adjusting puller wheels 102.

Figure 9A:
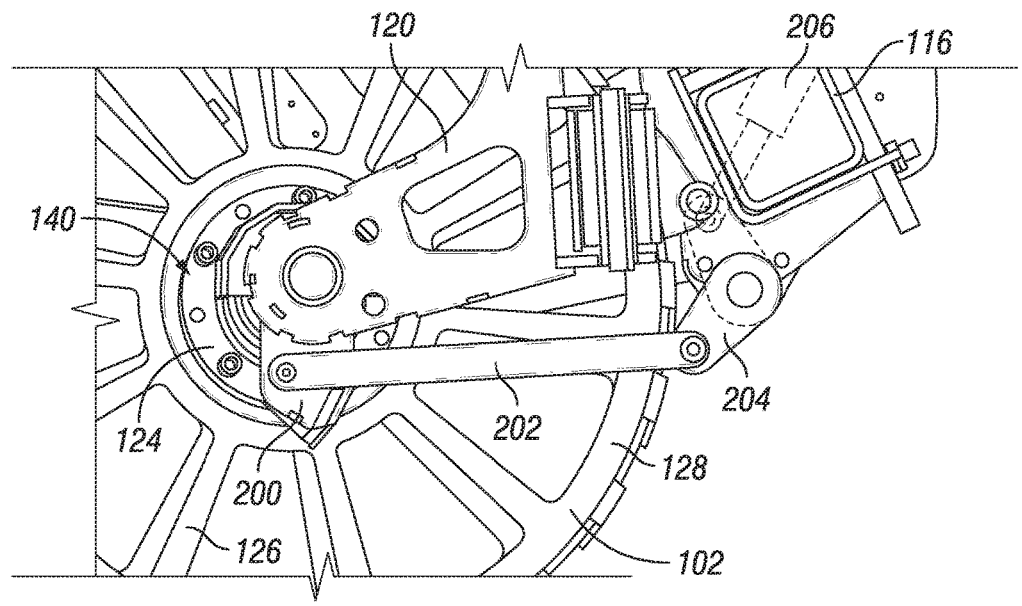
FIGS. 9A and 9B are side views showing operation of the gap actuation system of a beet harvester having adjustable gap puller wheels in accordance with the present disclosure.
Figure 9B:
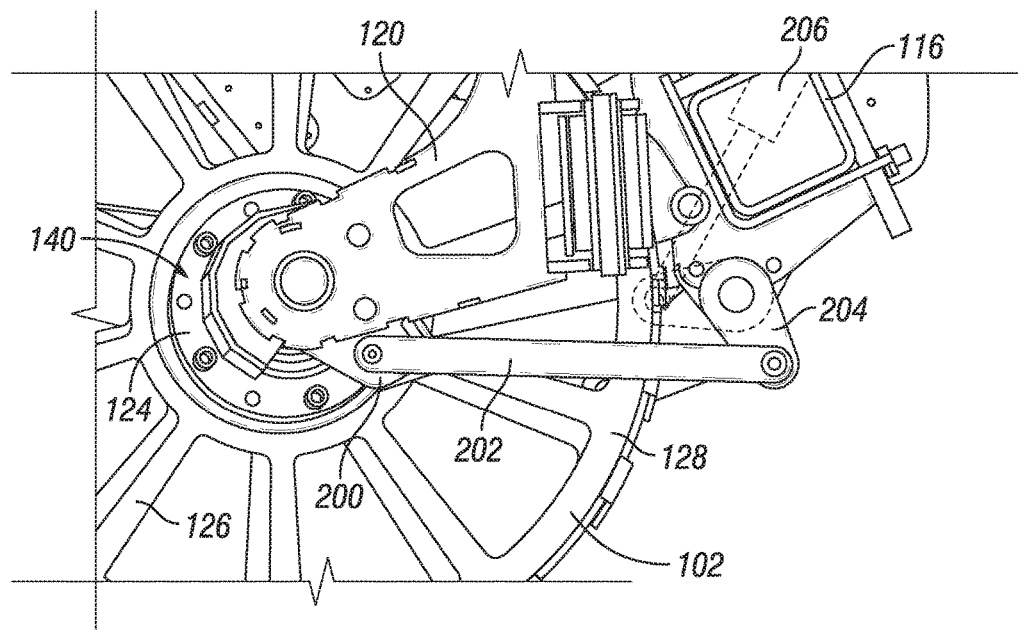

Advantageously, however, with the gap adjuster system shown herein, an automatic gap adjustment feature can also be used, thus further increasing the speed and efficiency of adjusting the puller wheels 102. As shown in FIGS. 9A and 9B, the automatic gap adjustment mechanism includes an actuator link 202 that is pivotally attached at one end to the actuator arm 200 of the adjuster mechanism, and at its opposite end to an actuator lever 204. The actuator lever 204 can be attached to any actuator device 206 that provides a source of rotational force, such as by a hydraulic or pneumatic actuator, an electrical motor or the like. When the actuator lever 204 rotates, its rotation is turned into generally linear motion of the actuator link 202, which in turn pushes or pulls on the actuator arm 200 and thus rotates the collar 142 of the gap adjuster 140 and changes the gap 132. In this way, a user can quickly and accurately adjust the gap adjuster 140 of a given wheel 102 by any selected amount by controlling the associated actuator device 206. This approach further decreases the time and effort required for adjusting the gaps between puller wheels 102 of a given harvester device (100 in FIG. 1) compared to the manual method of adjusting each gap adjuster 140, as described above. An independent actuator device 206 and automatic gap adjustment mechanism of this type can be associated with each puller wheel 102 or each puller wheel pair 118, to allow independent adjustment of the gap 132 for each pair of wheels.

Figure 10:
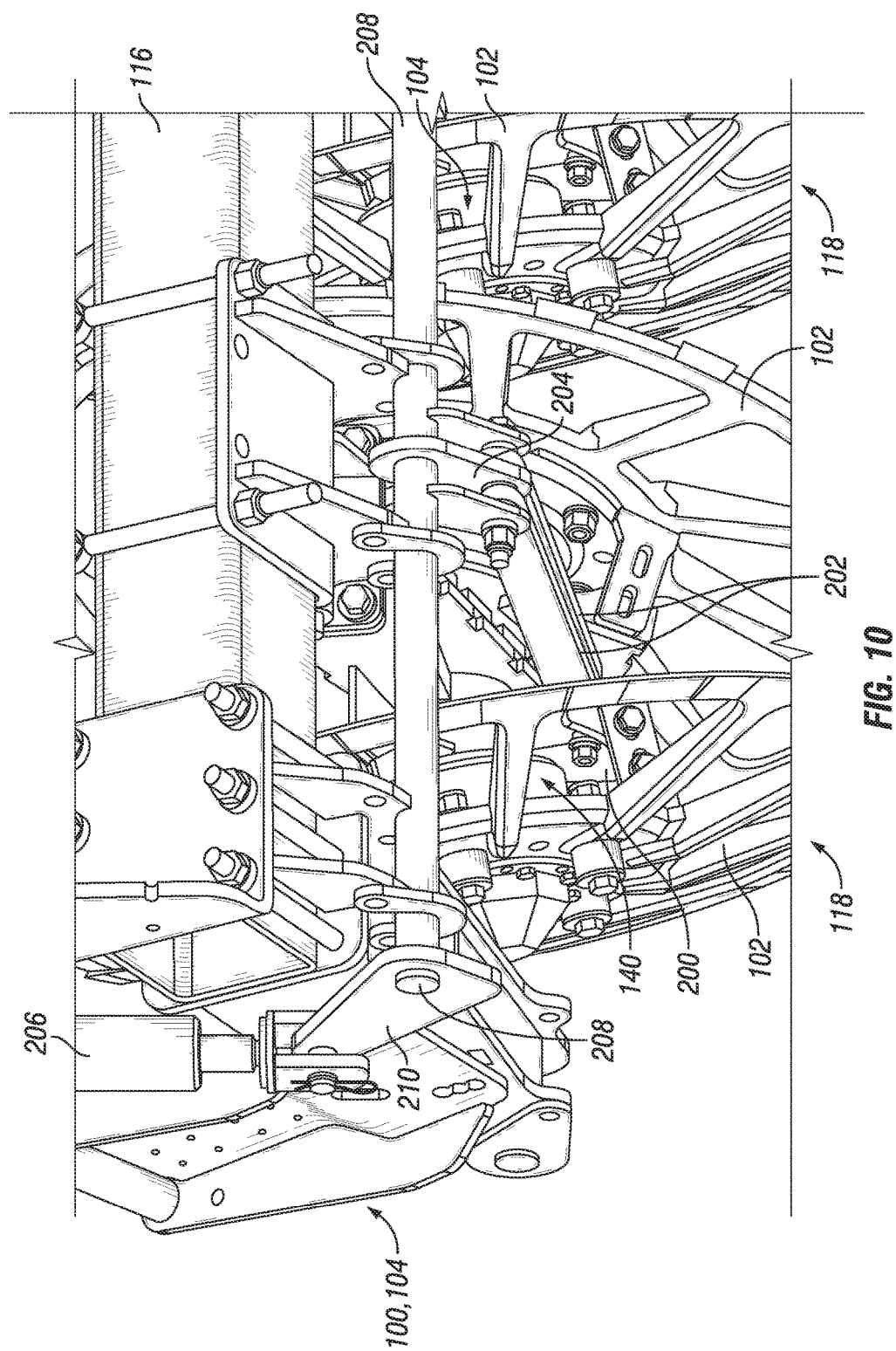
FIG. 10 is a perspective view of a portion of a beet harvester having a plurality of puller wheel sets with adjustable gaps and a wheel gap actuation system, in accordance with the present disclosure.

As yet another alternative, a sugar beet harvester apparatus (100 in FIG. 1) can include a common actuation mechanism, coupled to all gap adjusters 140 in an entire harvester device, which can simultaneously actuate the gap adjusters 140 of all sets of puller wheels 102 attached to the harvester frame 104. Such a system is shown in FIG. 10. The common actuation mechanism includes an actuator rod 208, which extends generally parallel to the wheeled frame 104 across the entire width of the frame 104/116. One or more actuator devices 206, such as hydraulic or pneumatic actuators, are also attached to the frame 104 and are pivotally connected to a lever arm 210 that is attached to the actuator rod 208. When the actuator device 206 extends or retracts, the lever arm 210 converts the linear motion of the actuator device 206 into rotation of the actuator rod 208. It will be apparent that other devices for rotating the actuator rod 208 can also be used, such as an electric motor, etc.

The actuator rod 208 includes a plurality of actuator levers 204 that are attached along its length, one for each puller wheel 102 or puller wheel pair 118. Each actuator lever 204 is pivotally attached to one end of an actuator link 202, which is pivotally attached at its opposite end to the actuator arm 200 of its associated gap adjuster 140, in the manner shown and discussed above with respect to FIGS. 9A and 9B. Through this connection, the actuator device 206 can rotate the actuator rod 208 and thus simultaneously rotate all actuator levers 204 and linearly translate all actuator links 202, to simultaneously rotate all gap adjusters 140. This common actuation mechanism thus simultaneously laterally moves all puller wheels 102 in the group, so that the wheels in each puller wheel pair 118 axially move on their respective axles in opposite directions, thus increasing or decreasing the respective minimum gap 132.

The disclosure thus provides an agricultural implement that uses canted wheels or disks that dig into the ground and have an adjustable spacing. Advantageously, the puller wheels 102 have a quick-adjust gap adjuster mechanism 140, which is configured to move the respective puller wheel 102 linearly or axially along its axle 144, allowing selective adjustment of the gap, thus making adjustment of the gap quicker and easier. Furthermore, a common actuation mechanism can be coupled to all gap adjuster 140s in an entire harvester device, allowing simultaneous adjustment of the gap adjuster 140s of all sets of puller wheels 102 in the harvester.

Although various embodiments have been shown and described, the present disclosure is not so limited and will be understood to include all such modifications and variations are would be apparent to one skilled in the art.

What is claimed is:

1. A sugar beet puller wheel set, comprising:
    a frame;
    a pair of axles attached to the frame, the pair of axles including a first axle and a second axle;
    a pair of generally upright, spaced apart, symmetrically non-parallel puller wheels, the pair of puller wheels including a first puller wheel and a second puller wheel, the first puller wheel being rotatably disposed on the first axle and the second puller wheel being rotatably disposed on the second axle, the first puller wheel and the second puller wheel having a gap therebetween; and
    a gap adjuster associated with the first puller wheel, the gap adjuster including a helical surface and a bearing surface, wherein sliding contact between the helical surface and the bearing surface produces movement of the first puller wheel axially along the first axle with axial rotation of the gap adjuster about the first axle, allowing selective magnitude adjustment of the gap.

2. A sugar beet puller wheel set in accordance with claim 1, wherein the gap adjuster comprises a collar slidably disposed upon the first axle, the first puller wheel being rotatably attached to the collar, the collar including one of the helical surface and the bearing surface, and the first axle including the other of the helical surface and the bearing surface.

3. A sugar beet puller wheel set in accordance with claim 2, wherein the helical surface is a first helical surface and the bearing surface is a helical mount, the sugar beet puller wheel set further comprising:
    a first helical bearing disposed at a proximal end of the collar, the first helical bearing comprising the first helical surface at the proximal end of the collar and the helical mount at a proximal end of the first axle; and
    a second helical bearing disposed at a distal end of the collar, the second helical bearing comprising a second helical surface at the distal end of the collar and a helical cap at a distal end of the first axle, the helical cap positioned in sliding contact with the second helical surface, wherein
    rotational sliding of the first helical surface against the helical mount and rotational sliding of the second helical surface against the helical cap produces axial translation of the collar along the first axle.

4. A sugar beet puller wheel set in accordance with claim 2, wherein the collar is of a material selected from the group consisting of steel, aluminum, and polymers.

5. A sugar beet puller wheel set in accordance with claim 1, wherein the gap adjuster is infinitely adjustable within an adjustment range.

6. A sugar beet puller wheel set in accordance with claim 5, wherein the adjustment range is from 2" to 3".

7. A sugar beet puller wheel set in accordance with claim 1, wherein the pair of axles are oriented at symmetrically opposite downward and rearward offset angles.

8. A sugar beet puller wheel set in accordance with claim 7, wherein the downward offset angle is about 9° and the rearward offset angle is about 10°.

9. A sugar beet puller wheel set in accordance with claim 1, further comprising:
   another gap adjuster associated with the second puller wheel, the gap adjuster and the another gap adjuster forming a pair of gap adjusters; and
   an actuation mechanism, attached to the pair of gap adjusters, configured to simultaneously actuate the pair of gap adjusters to oppositely axially move the first puller wheel and the second puller wheel.

10. A sugar beet puller wheel set in accordance with claim 9, wherein the actuation mechanism comprises:
    a pair of actuator links attached to the pair of gap adjusters; and
    a hydraulic actuator configured to linearly translate the pair of actuator links to rotate the pair of gap adjusters.

11. A sugar beet harvester apparatus, comprising:
    a wheeled frame, configured to move along a ground;
    a plurality of pairs of axles attached to the wheeled frame, each pair of axles including a first axle and a second axle;
    a plurality of pairs of generally upright, spaced apart, symmetrically non-parallel puller wheels, each pair of puller wheels including a first puller wheel and a second puller wheel, the first puller wheels associated with the first axles and the second puller wheels associated with the second axles, each of the puller wheels of the pair of puller wheels having a rim configured for cutting into the ground, each pair of puller wheels having a rearward portion with a minimum gap therebetween; and
    a pair of gap adjusters associated with each pair of puller wheels, including a first gap adjuster associated with the first puller wheel and a second gap adjuster associated with the second puller wheel,
        the first gap adjuster including a first collar, slidably disposed upon the first axle, and including a first helical surface and a first bearing surface, the first helical surface and the first bearing surface being in sliding contact, the first collar including one of the first helical surface and the first bearing surface, and the first axle including the other of the first helical surface and the first bearing surface, the first puller wheel being rotatably attached to the first collar, axial rotation of the first collar about the first axle causing lateral translation of the first collar and attached first puller wheel by sliding contact between the first helical surface and the first bearing surface, and
        the second gap adjuster including a second collar, slidably disposed upon the second axle, and including a first helical surface and a first bearing surface, the first helical surface and the first bearing surface being in sliding contact, the second collar including one of the first helical surface and the first bearing surface, and the second axle including the other of the first helical surface and the first bearing surface, the second puller wheel being rotatably attached to the second collar, axial rotation of the second collar about the second axle causing lateral translation of the second collar and attached second puller wheel by sliding contact between the first helical surface and the first bearing surface, whereby a magnitude of the minimum gap is selectively adjustable.

12. An apparatus in accordance with claim 11, wherein the minimum gap is infinitely adjustable within an adjustment range of from 2" to 3".

13. An apparatus in accordance with claim 11, further comprising an actuation mechanism, coupled to the first gap adjuster and the second gap adjuster, configured to simultaneously actuate the pair of gap adjusters to oppositely axially move the first puller wheel and second puller wheel of each pair of puller wheels.

14. An apparatus in accordance with claim 13, wherein the actuation mechanism comprises:
    an actuator rod, extending generally parallel to the wheeled frame;
    a pair of lever arms associated with each pair of gap adjusters and attached to the actuator rod;
    a pair of actuator links attached to the pair of lever arms, each actuator link of the pair of actuator links attached to a respective gap adjuster; and
    a hydraulic actuator, configured to rotate the actuator rod, to linearly translate the pair of actuator links associated with each pair of gap adjusters to simultaneously rotate all of the pairs of gap adjusters.

15. An apparatus in accordance with claim 11, wherein the first bearing surface of the first collar is a helical mount, the first gap adjuster further comprising:
    a first helical bearing disposed at a proximal end of the first collar, the first helical bearing comprising the first helical surface at the proximal end of the first collar and the helical mount at a proximal end of the first axle; and
    a second helical bearing disposed at a distal end of the first collar, the second helical bearing comprising a second helical surface at the distal end of the first collar and a helical cap at a distal end of the first axle, the helical cap positioned in sliding contact with the second helical surface, wherein rotational sliding of the first helical surface against the helical mount and
    rotational sliding of the second helical surface against the helical cap produces axial translation of the first collar along the first axle.

16. An apparatus in accordance with claim 11, wherein the axles of each pair of axles are oriented at symmetrically opposite downward and rearward offset angles.

17. A sugar beet harvester apparatus, comprising:
    a plurality of pairs of generally upright, spaced apart, symmetrically rearwardly canted puller wheels, disposed in a transverse row, each puller wheel of each pair of puller wheels having an axle and a rim configured for cutting into ground, each pair of puller wheels having a minimum gap in a rearward region; and
    a plurality of pairs of rotatable collars, each puller wheel being rotatably attached to a respective rotatable collar of the plurality of pairs of rotatable collars, each rotatable collar having helical bearings at opposite ends thereof, axial rotation of the rotatable collar upon its respective axle causing lateral translation of the rotatable collar and the attached puller wheel, whereby a magnitude of the minimum gap is selectively adjustable,
    wherein each of the helical bearings comprises a helical surface and a bearing surface, wherein sliding contact between the helical surface and the bearing surface moves the rotatable collar and attached puller wheel axially along the axle with axial rotation of the rotatable collar.

18. An apparatus in accordance with claim 17, wherein the minimum gap is infinitely adjustable within an adjustment range of from 2" to 3".

19. An apparatus in accordance with claim 17, further comprising an actuator, coupled to each rotatable collar, configured for powered rotation of the rotatable collar.

20. An apparatus in accordance with claim 17, further comprising an actuation mechanism, coupled to each pair of rotatable collars configured to simultaneously actuate all of the rotatable collars of the pair of rotatable collars to oppositely axially move the respective puller wheels of each pair.

* * * * *